(12) United States Patent
Phua et al.

(10) Patent No.: US 6,912,328 B2
(45) Date of Patent: Jun. 28, 2005

(54) REAL-TIME POLARIZATION MODE DISPERSION CHARACTERIZATION

(75) Inventors: Poh-Boon Phua, Cambridge, MA (US); John M. Fini, Jersey City, NJ (US)

(73) Assignee: Massachusetts Institute of Technology, Cambridge, MA (US)

( * ) Notice: Subject to any disclaimer, the term of this patent is extended or adjusted under 35 U.S.C. 154(b) by 178 days.

(21) Appl. No.: 10/263,778

(22) Filed: Oct. 4, 2002

(65) Prior Publication Data

US 2003/0118263 A1 Jun. 26, 2003

Related U.S. Application Data (60) Provisional application No. 60/327,150, filed on Oct. 4, 2001.

(51) Int. Cl.[7] .............................. G02B 6/00; G01N 21/00
(52) U.S. Cl. ......................................... 385/11; 356/73.1
(58) Field of Search ........................... 385/11; 356/73.1, 356/364–367; 398/28–29

(56) References Cited

U.S. PATENT DOCUMENTS 5,965,874 A 10/1999 Aso et al.
6,342,945 B1 1/2002 Allen et al.
6,563,590 B2 * 5/2003 Chowdhury et al. ......... 356/484
2002/0093643 A1 7/2002 Moeller
2002/0176645 A1 * 11/2002 Wein et al. .................... 385/11
2003/0067641 A1 * 4/2003 Wein et al. .................. 359/110
2003/0095313 A1 * 5/2003 Menikoff et al. ........... 359/161

OTHER PUBLICATIONS

U.S. Provisional Application No. 60/325,422.*

* cited by examiner

Primary Examiner—Michelle R. Connelly-Cushwa
(74) Attorney, Agent, or Firm—Fish & Richardson P.C.

(57) ABSTRACT

In optical media (e.g., an optical fiber) having first and second order polarization mode dispersion, the relationship between the polarization mode dispersion and the change in the measured averaged state of polarization of an optical signal in the media as a function of the signal's bandwidth can be predictable. Accordingly, first and second order polarization can be determined by measuring a series of the averaged state of polarization's for an optical signal with varying signal bandwidths.

19 Claims, 6 Drawing Sheets

REAL-TIME POLARIZATION MODE DISPERSION CHARACTERIZATION

CROSS-REFERENCE TO RELATED APPLICATIONS

This application claims priority to U.S. Provisional Application Ser. No. 60/327,150, entitled "FIRST AND SECOND ORDER PMD CHARACTERIZATION USING BANDWIDTH-AVERAGED STATE-OF-POLARIZATION" and filed Oct. 4, 2001, which is incorporated herein by reference in its entirety.

BACKGROUND OF THE INVENTION

The invention relates generally to fiber optics and more specifically to methods of characterizing the polarization mode dispersion in a fiber optic transmission system.

Polarization mode dispersion ("PMD") generally refers to variations in the time delay of a polarized optical signal traveling through an optical transmission system, such as a single-mode optical fiber. PMD arises in an optical fiber because of asymmetries in the optical fiber core, such as, for example, core ellipticity created during optical manufacturing and bending stresses resulting from handling or formed during installation. The asymmetries of the fiber core cause random changes in the state of polarization ("SOP") of optical signals propagating through the fiber. Different SOPs propagate through the optical fiber core at different relative speeds, for example, some SOPs travel faster and some travel slower, resulting in a pulse width distortion of a transmitted optical signal relative to an input optical signal. Additionally, the asymmetries of the core are highly susceptible to environmental fluctuations, such as temperature or movement of the fiber, which occur as fast as milliseconds and result in a time varying pulse width distortion of the transmitted optical signal.

First order PMD refers to a time delay between two orthogonally polarized principal states of polarization ("PSP"). The PSPs form a convenient basis set to describe and characterize each SOP, and evaluate the effects of PMD in the fiber. Using the PSPs as a basis set, each SOP propagating through an optical fiber is represented by a linear combination of the two orthogonally polarized PSPs. The varying pulse width distortion of the SOP is a function of a varying delay between the PSPs. Theoretically, each PSP experiences a time of flight difference through the optical fiber, commonly known as differential group delay (DGD), resulting in a time delay between the two PSPs at the fiber output. The output SOP is represented by a linear combination of the PSPs that are time delayed with respect to each other. A greater time delay between the PSPs corresponds to a larger relative difference between the input SOP pulse width and the output SOP pulse width.

Optical fibers have a differential group delay ("DGD") between the two PSPs on the order of 0.1 ps/(km)$^{1/2}$. In older fiber optic cables, such as the cables used in terrestrial networks, the DGD is on the order of 2.0 ps/(km)$^{1/2}$ and results in time delays of about 50 picoseconds for transmission distances of only several hundred kilometers.

Second order PMD refers to the frequency dependence of the first order PMD. This is related to chromatic dispersion of signals in optical fibers, which arises due to the frequency dependence of the refractive index of the fiber. Second order PMD causes the dispersion of the PSPs, which further distorts the optical signal propagating in the fiber.

As the demand for faster optical data transmission increases, such as from gigabits per second to terabits per second, optical pulse width distortion due to PMD may become one of the factors limiting data transmission rate.

SUMMARY

In optical media (e.g., an optical fiber) having first and second order polarization mode dispersion ("PMD"), there is a predictable relationship between the PMD and the change in the measured averaged state of polarization ("SOP") of an optical signal in the media as a function of the signal's bandwidth. Accordingly, the first and second order PMD is determined by measuring a series of averaged SOPs for varying signal bandwidths. The signal bandwidth can be varied symmetrically or asymmetrically with respect to a particular frequency.

In one aspect, a method for characterizing polarization mode dispersion in an optical medium includes measuring an averaged state of polarization vector of an optical signal in the optical medium for each of a plurality of spectra, each spectrum having a frequency bandwidth different from the other spectra of the plurality of spectra. The method further includes determining a characteristic of the polarization mode dispersion from an averaged state of polarization vectors and the frequency bandwidths.

Embodiments of the method can include one or more of the following features.

At least a portion of the plurality of spectra have a symmetric bandwidth about a predefined frequency. Alternatively, or additionally, at least a portion of the plurality of spectra have an asymmetric bandwidth about a predefined frequency.

In some embodiments, the method further includes determining a second state of polarization vector from the measured averaged state of polarization vectors for each of a plurality of spectra, each of the second state of polarization vectors having a symmetric bandwidth about a predefined frequency. Alternatively, or additionally, the method can further includes determining additional state of polarization vector from the measured averaged state of polarization vectors for each of a plurality of spectra, each of the additional state of polarization vectors having an asymmetric bandwidth about a predefined frequency.

Measuring the averaged state of polarization vector of the optical signal can include deriving a test optical signal from the optical signal, optically filtering the test signal, and measuring averaged state of polarization vectors of the filtered test signal. Optically filtering the test signal can include sequentially directing the test signal through each of a plurality of bandpass filters, and measuring an averaged state of polarization vector for each of the bandpass filters. The frequency spectra of the averaged state of polarization vectors can be related to the bandpass filters.

Determining the characteristic of the polarization mode dispersion can include measuring a perturbation of the averaged state of polarization vectors from a polarization state at a predefined frequency and a parameter related to the bandwidths of the different spectra. The characteristic of polarization mode dispersion can include a measure of first order polarization mode dispersion and/or a measure of the second order polarization mode dispersion (e.g., a four component vector characterizing the first or second polarization mode dispersion). The characteristic of polarization mode dispersion can be determined in real-time.

The method can be used to characterize polarization mode dispersion in a number of optical media. For example, the optical medium can be an optical fiber, a birefringent crystal, an optical polymer, or a liquid crystal. Another example is an optical delay line.

Determining the characteristic of polarization mode dispersion can include determining a trajectory of the averaged state of polarization in the Poincaré sphere as a function of frequency bandwidth.

In another aspect, an optical system includes a variable optical filter positioned to variably filter the transmission bandwidth of an optical test signal to a polarimeter, and a polarimeter configured to receive the filtered optical test signal and to measure the average state of polarization of the optical test signal for each transmission bandwidth. The system also includes a controller configured to determine first and second order polarization mode dispersion parameters of the optical input signal based on the average state of polarization and the transmission bandwidth of the filtered optical test signal. The optical system can be configured to implement the method for characterizing polarization mode dispersion.

In yet another aspect, an optical system can include an optical fiber configured to transmit an optical signal between a first location and a second location, a polarimeter configured to receive an optical test signal derived from the optical signal, and to measure an averaged state of polarization for different transmitted bandwidths of the optical input signal, and a controller in communication with the polarimeter and configured to determine first and second polarization mode dispersion parameters of the optical signal based on the averaged state of polarization and transmitted bandwidths of the optical test signal.

Embodiments of the optical system can include one or more of the following features. The optical system can further include an optical fiber configured to transmit an optical signal from a first location to a second location, wherein the optical test signal is derived from the optical signal. The optical system can also include a compensator configured to compensate the optical signal based on the first and second order polarization mode dispersion parameters to produce a compensated output optical signal. The optical signal can be compensated in a feed-forward mode. The system can include a receiver and/or a transmitter. The receiver can be configured to detect the compensated output optical signal at the second location. The transmitter can be configured to launch the optical signal into the optical fiber at the first location. The transmitter can include a polarization scrambler.

The optical system can include a tap to derive the optical test signal from the optical signal. The tap can be coupled to the optical fiber near the second location, and can direct the optical test signal into a waveguide that is coupled to the variable optical filter and the polarimeter. First and second order polarization mode dispersion parameters of the optical test signal can be related to first and second order polarization mode dispersion parameters of the optical signal. For example, first and second order polarization mode dispersion parameters of the optical test signal can be the same as first and second order polarization mode dispersion parameters of the optical signal.

Embodiments of the methods or optical system can include one or more of the following advantages. The methods can characterize first and second order PMD real-time, and can be implemented in feed-forward mode. In some embodiments, the methods can be used to estimate first and second order PMD for setting the starting point for feedback PMD algorithms from which to work. The methods can be implemented without disrupting the operation of the optical telecommunications channels they are monitoring. The methods can be readily implemented in existing telecommunications systems, and apparatus for implementing the methods can be installed at the receiver end of a fiber optic system and can utilize components already in the system. Because the techniques measure the SOP of an optical signal averaged over relatively large bandwidths (e.g., more than 1 GHz, such as 5 GHz or more), measurements can be made with high speed and a high signal-to-noise ratio. The techniques disclosed herein can be implemented to characterize the optical properties of other optical components (e.g., birefringent components).

Unless otherwise defined, all technical and scientific terms used herein have the same meaning as commonly understood by one of ordinary skill in the art. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1:
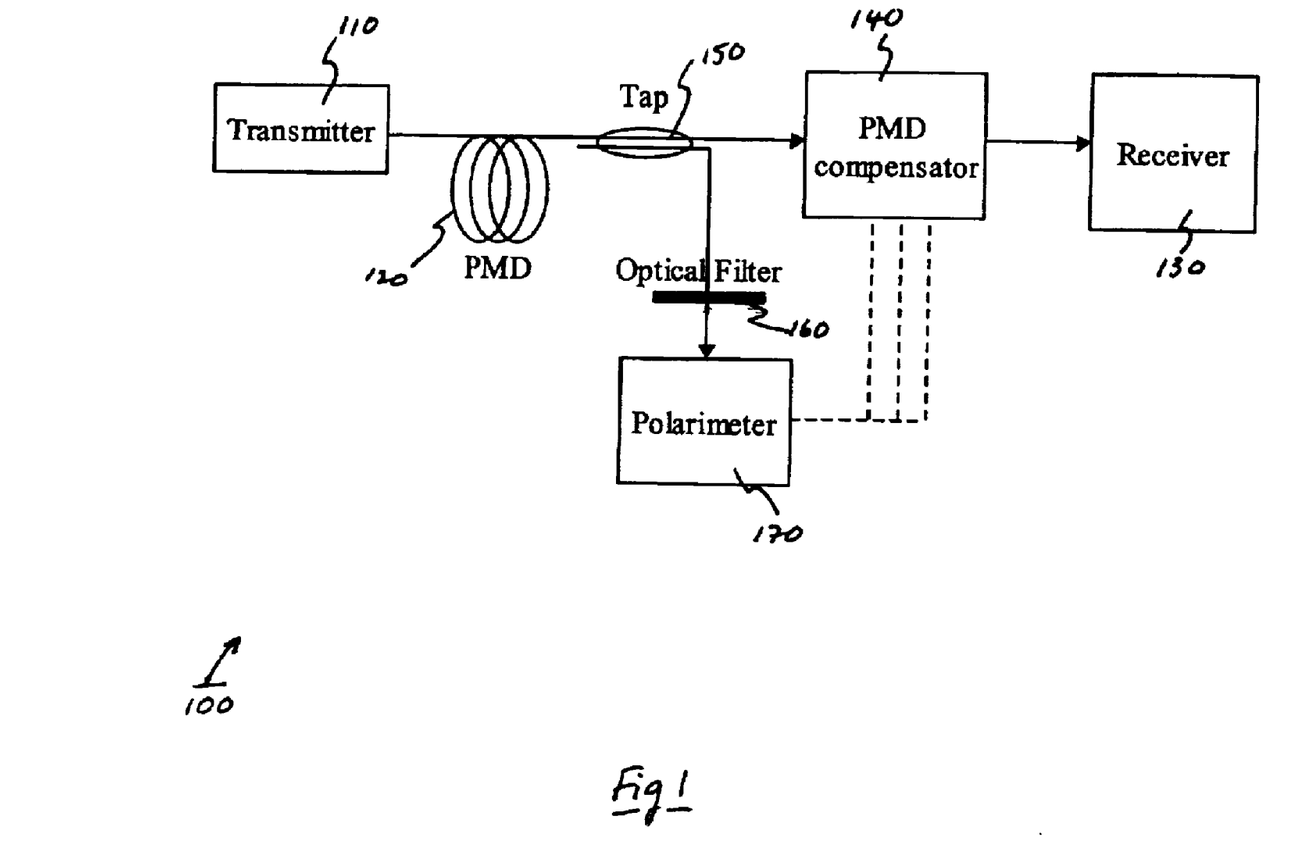
FIG. 1 is a schematic representation of a fiber optic system including components for characterizing the polarization mode dispersion ("PMD") in the system.

Referring to FIG. 1, a fiber optic system 100 includes a transmitter 10, an optical fiber 120, and a receiver 130. During operation, transmitter 10 launches a polarized optical input signal into one end of optical fiber 120. Transmitter 10 includes a light source, such as a laser diode. Optionally, transmitter 110 can include a polarization scrambler, which randomly varies the polarization state of the optical input signal prior to coupling the signal into optical fiber 120. Optical fiber 120 transmits the optical signal to the opposite end of the fiber where it is detected by receiver 130.

Fiber optic system 100 also includes a polarization mode dispersion ("PMD") compensator 140 for reducing the PMD of optical signals transmitted through optical fiber 120. PMD compensator 140 reduces the PMD of optical signals by modifying the polarization state of the optical signal based on the measured PMD of a test signal derived from the optical signal at tap 150. The state of polarization ("SOP") and PMD of the test signal are related to the SOP and PMD of the optical signal in a predictable way. Thus, measuring the PMD of the test signal provides a measure of the PMD of the optical signal emerging from optical fiber 120. The test signal is passed through a variable optical filter 160, which includes multiple filters of different bandwidth. During operation, variable optical filter 160 sequentially filters the test signal with each of the multiple filters, and a polarimeter 170 measures the averaged SOP of each of the filtered test signals. Polarimeter 170 includes a processor (not shown), which determines one or more characteristics of the PMD of the test signal from the measured average SOPs, and adjusts PMD compensator 140 to reduce the PMD of the optical signal in real-time. PMD compensator 140 works in a feed-forward scheme.

In general, variable optical filter 160 can be any filter or combination of filters that provide a suitable range of transmission frequencies and transmission bandwidths to determine the PMD of the optical test signal. For example, one can place two filters having overlapping, broadband transmission spectra one after another. Varying the center frequencies of their transmission bands varies the bandwidth of a signal transmitted by the filter pair. Another example is to provide a number of Fabry Perot filters, each having a different transmission bandwidth and to do filtering separately. In general, the range of transmission bandwidths used to filter the test signal depends on the DGD of optical fiber 120. Accordingly, variable optical filter 160 should be selected to provide a sufficient maximum bandwidth and range of bandwidths for the particular system in which it is being implemented.

To determine the PMD of the test signal, polarimeter 170 measures the averaged SOP of the filtered test signal for several different transmission bands of variable filter 160. Due to the finite response time of detectors used in the polarimeter, the polarimeter intrinsically measures the SOP averaged over the pulse duration. Equivalently, in the frequency domain, the polarimeter averages the SOP over the spectral bandwidth of the transmitted filtered test signal. Accordingly, the measured SOP is an averaged SOP.

Before describing specific implementations for determining the PMD of fiber 120, it can be useful to describe the mathematical formalism used to determine PMD from the acquired data A frequency-dependent SOP is defined in terms of a Stokes vector:

$$S(\omega) = (S_0\ S_1\ S_2\ S_3) \quad (1)$$

where $$S_0 = E_x^2 + E_y^2 \quad (2)$$

$$S_1 = E_x^2 - E_y^2 \quad (3)$$

$$S_2 = 2E_x E_y \cos(\phi) \quad (4)$$

$$S_3 = 2E_x E_y \sin(\phi) \quad (5)$$

and $E_x$ and $E_y$ are the magnitudes of the x and y component electric field complex amplitudes, respectively. $\phi$ is the relative phase between the two.

Figure 2:
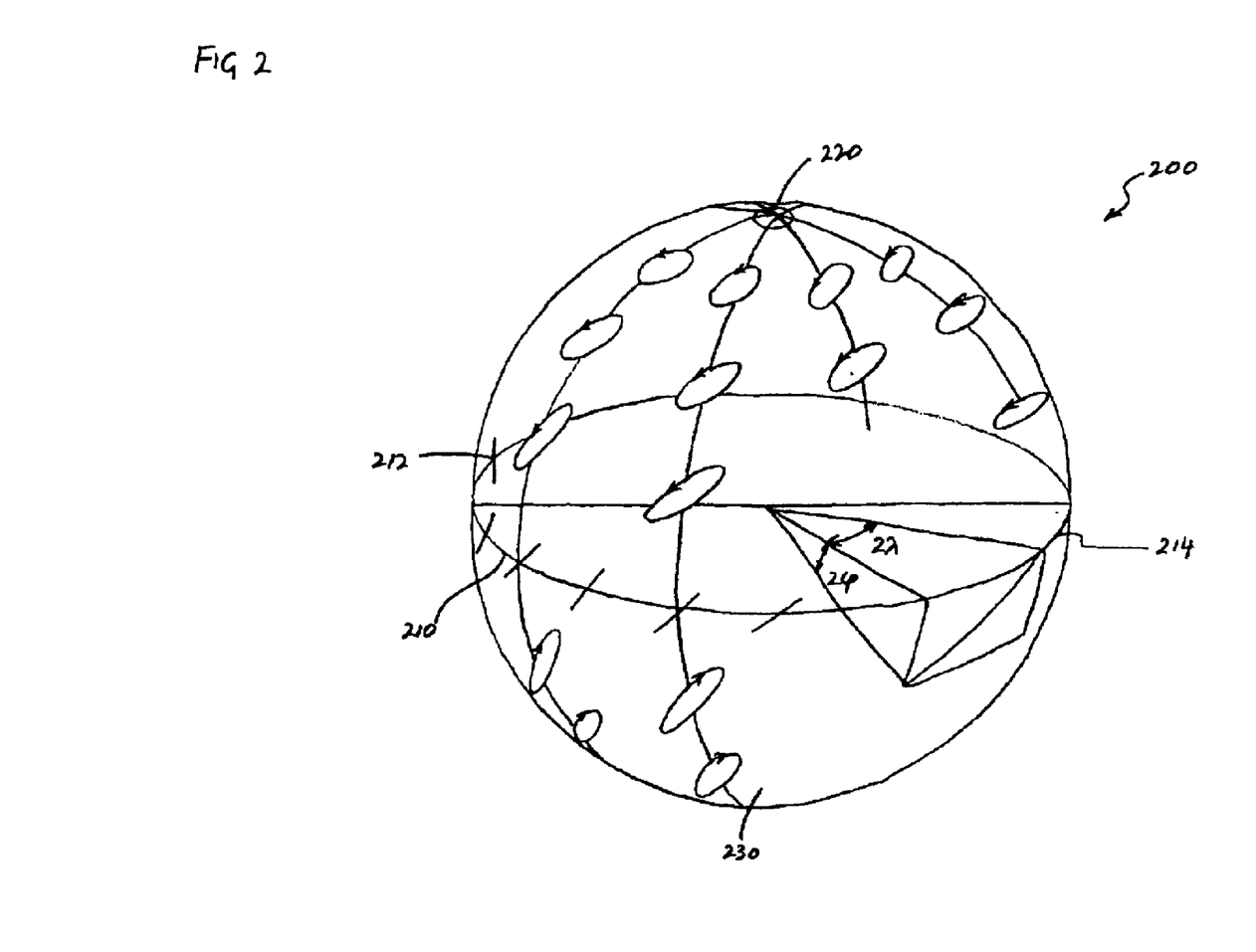
FIG. 2 is a schematic representation of a Poincaré sphere.
Figure 3:
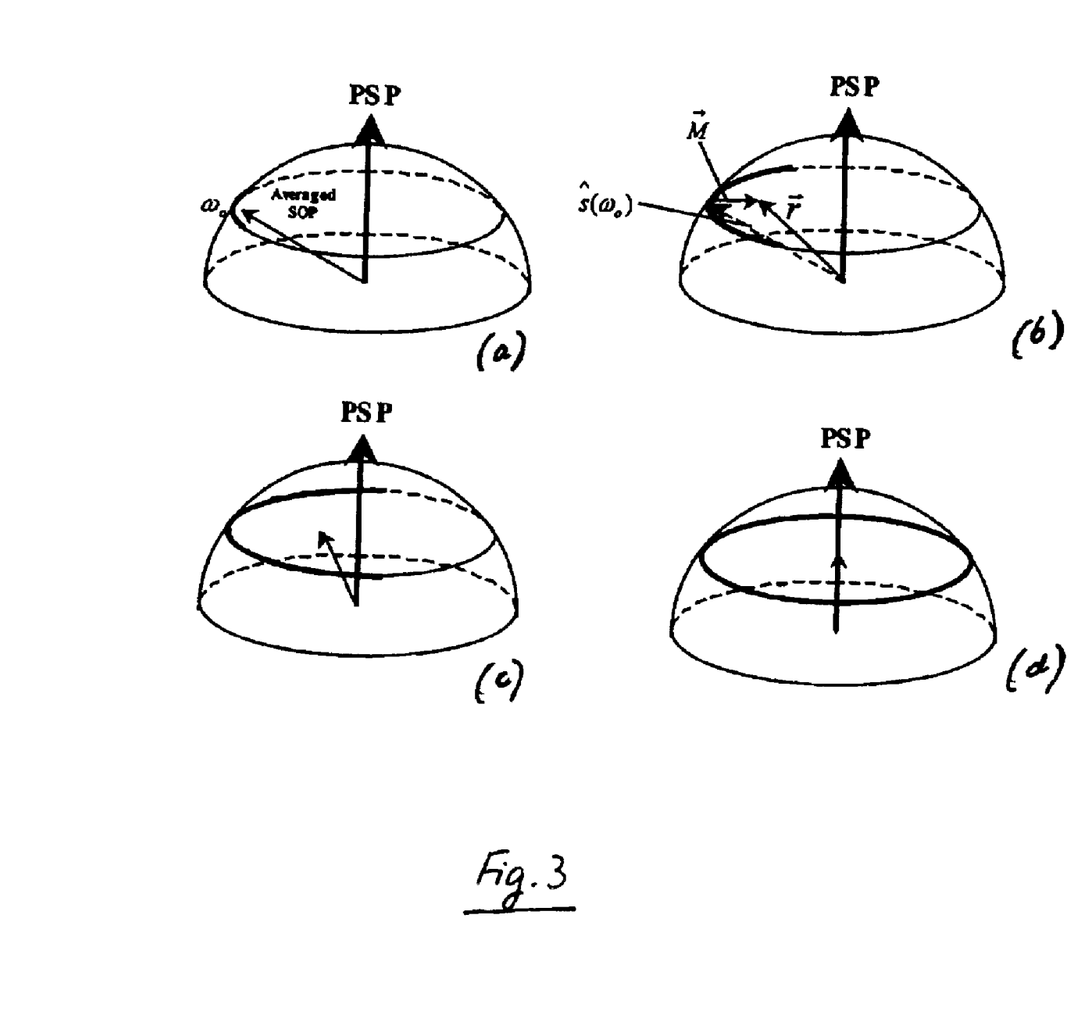
FIGS. 3(a)–3(d) are schematic representations of the Poincaré sphere showing the motion of averaged state of polarization ("SOP") measurements as a function of symmetrically broadening bandwidth for a system with negligible second order PMD.

Referring to FIG. 2, a convenient and intuitive graphical representation of SOPs is a Poincaré sphere 200. The parameters $s_1(\omega)$, $s_2(\omega)$ and $s_3(\omega)$) are represented by the relationship $s_i(\omega) = (S_1)/(S_0)$, where i is 1, 2, or 3, and are used to convert the Stokes parameters to corresponding x, y, and z components in a three dimensional Cartesian coordinate system. In a three dimensional Cartesian coordinate system, Poincaré sphere 200 is defined by a set of points containing all possible SOPs. Points on the surface of the sphere represent purely polarized states, while points inside the sphere represent partially polarized SOPs. As seen in FIG. 2, all linear polarization states are located on an equator 210 of sphere 200, while left and right circular polarizations are located at a north pole 220 and a south pole 230 (opposite north pole 220), respectively. All other points represent elliptical polarizations that lie away from equator 210 and poles 220, 230. Each SOP on sphere 200 is identifiable by its latitude, 2, and longitude, 2A, by using equations:

$$s_1(\omega) = \cos(2\phi)\cos(2\lambda) \quad (6)$$

$$s_2(\omega) = \cos(2\phi)\sin(2\lambda) \quad (7)$$

$$s_3(\omega) = \sin(2\phi) \quad (8)$$

where any two orthogonal SOPs lie directly opposite each other. For example, a linear vertical polarization 212 is 180 degrees away from a linear horizontal polarization 214 on equator 210.

Referring to FIG. 1, polarimeter 170 measures a weighted average of the Stokes vector $\hat{s}(\omega)$ across the spectrum of the signal. This averaged SOP, $\vec{r}$, is given by $$\vec{r} = \int \frac{d\omega}{2\pi} |f(\omega)|^2 \hat{s}(\omega) \quad (9)$$

where $|f(\omega)|^2$ is the filtered test signal spectrum normalized to $$\int \frac{d\omega}{2\pi} |f(\omega)|^2 = 1.$$

In the limit of a narrowband filtered test signal $|f(\omega)|^2 \to \delta(\omega - \omega_0)$, and $\vec{r} \to \hat{s}(\omega_0)$, where, $\omega_0$ is the frequency of a nominally monochromatic pulse.

The PMD Stokes vector, $\vec{\Omega}(\omega)$, describes the trajectory of the test signal SOP, $\hat{s}(\omega)$, on the Poincaré sphere, as a function of frequency, and is related to the test signal SOP by $$\frac{d}{d\omega} \hat{s}(\omega) = \vec{\Omega} \times \hat{s}(\omega). \quad (10)$$

The magnitude of the PMD Stokes vector is the differential group delay ("DGD"), i.e., $|\vec{\Omega}| = \tau_{DGD}$, and its direction, $\hat{\Omega}$, is the PSP direction.

Taking a Taylor expansion of $\hat{s}(\omega)$ around $\omega_0$ up to second order, substituting into Eq. (9) and making use of Eq. (10), one obtains an expression for the measured SOP, $\vec{r}$, as a function of the parameters $\Delta\omega p_{pulse}$ and $\Delta\omega^2_{pulse}$:

$$\vec{r} = \hat{s}(\omega_0) + \Delta\omega_{pulse}[\vec{\Omega} \times \hat{s}(\omega_0)] + \frac{1}{2}\Delta\omega_{pulse}^2[\vec{\Omega} \times [\vec{\Omega} \times \hat{s}(\omega_0)] + \vec{\Omega}_\omega \times \hat{s}(\omega_0)] \quad (11)$$

where $$\Delta\omega_{pulse} \equiv \int \frac{d\omega}{2\pi}|f(\omega)|^2(\omega-\omega_0),$$

$$\Delta\omega_{pulse}^2 \equiv \int \frac{d\omega}{2\pi}|f(\omega)|^2(\omega-\omega_0)^2 \text{ and } \vec{\Omega}_\omega \equiv \frac{d\vec{\Omega}}{d\omega}$$

is the $2^{nd}$ order PMD. Eq. (11) expresses $\vec{r}$ as perturbed from the pure polarization state $\hat{s}(\omega_0)$, by a vector, $\vec{M}$, which is defined as $$\vec{M} = \vec{r} - \hat{s}(\omega_0) = \Delta\omega_{pulse}[\vec{\Omega}\times\hat{s}(\omega_0)] + \frac{1}{2}\Delta\omega_{pulse}^2[\Omega\times[\vec{\Omega}\times\hat{s}(\omega_0)] + \vec{\Omega}_\omega\times\hat{s}(\omega_0)] \quad (12)$$

Referring to FIGS. 3(a)–(d), a system with purely first order PMD (i.e., $\vec{\Omega}_a=0$) such as for a birefringent crystal or a polarization maintaining fiber, is shown. In this case, $\vec{M}$ is a vector lying in a plane normal to the PSP axis. For a monochromatic signal having Stokes vector $\hat{s}(\omega_0)$, $\vec{M}$−=0 and $\vec{r}$ is a point on the surface of the Poincaré sphere. If F is measured over a finite bandwidth in a system having first order PMD (i.e., non-zero $\vec{\Omega}$) as is usually the case in real systems, it represents an averaged SOP that is partially polarized (i.e., $\vec{\Omega}$) and $\vec{r}$ departs the surface of the Poincaré sphere. As one increases the spectral bandwidth of the signal, the averaged SOP prescribes a trajectory originating on the surface of the Poincaré sphere and moving inward toward the PSP.

Figure 4:
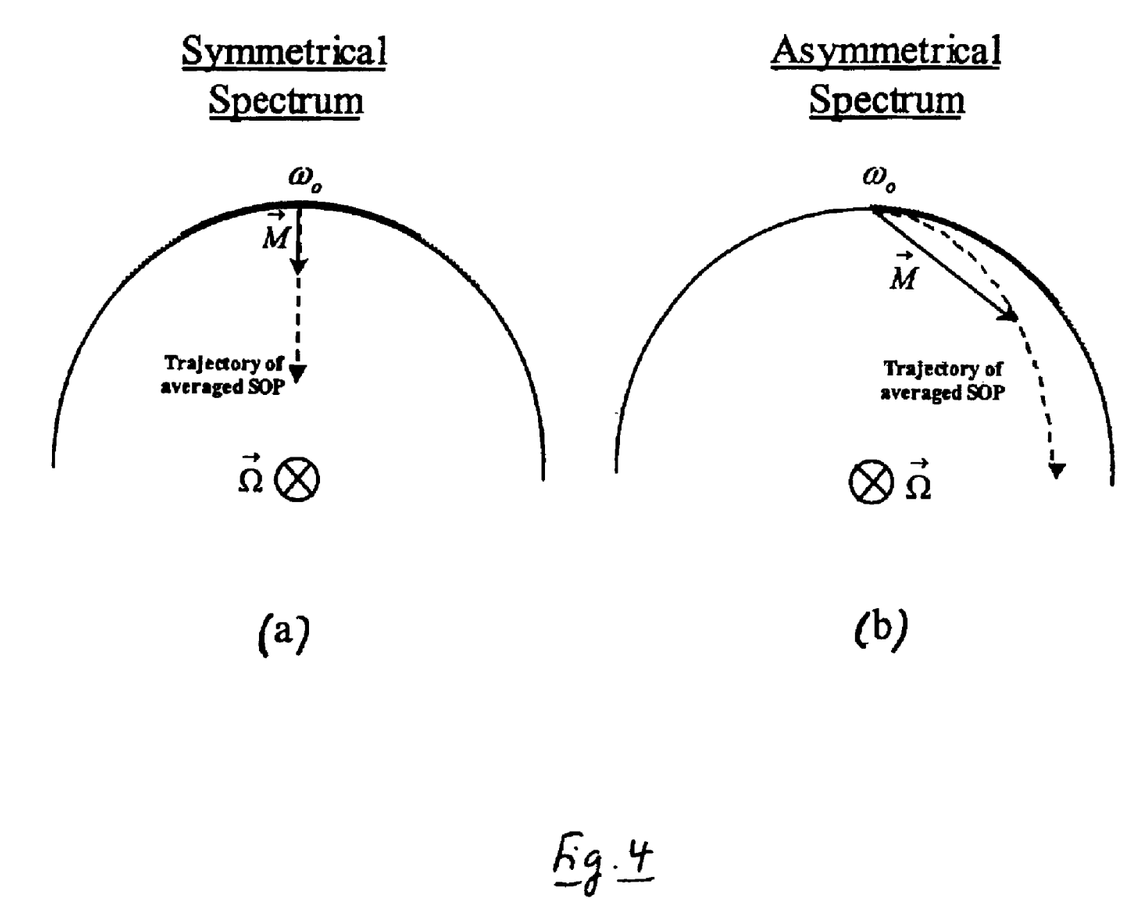
FIGS. 4(a) and 4(b) are schematic representations of a section of the Poincaré sphere perpendicular to a principle state of polarization ("PSP") showing the trajectory of averaged SOP for symmetrically and asymmetrically broadening bandwidth about $\omega_0$, respectively.

Referring to FIGS. 4(a) and 4(b), for a system with purely first order PMD and a spectrum that is symmetrical about $w\omega_n$ (i.e., $\Delta\omega_{pulse}=0$), $\vec{M}$ reduces to $$\vec{M} = \frac{1}{2}\Delta\omega_{pulse}^2 \vec{\Omega}\times[\vec{\Omega}\times\hat{s}(\omega_0)] \quad (13)$$

The $\vec{\Omega}\times\vec{\Omega}\times$ term is a reduction of components orthogonal to $$\vec{\Omega}\left(\text{generally called } \vec{s}_\perp(\omega_0), \text{ given by } \vec{s}_\perp = \hat{s} - \frac{(\hat{s}\cdot\vec{\Omega})\vec{\Omega}}{\tau_{DGD}^2}\right).$$

The following equations result:

$$\vec{r} = \hat{s}(\omega_o) - \frac{1}{2}\Delta\omega_{pulse}^2 \tau_{DGD}^2 \vec{s}_\perp(\omega_0) \text{ and} \quad (14)$$

$$\vec{M} = -\frac{1}{2}\Delta\omega_{pulse}^2 \tau_{DGD}^2 \vec{s}_\perp(\omega_0). \quad (15)$$

Recalling that $\hat{\Omega}$ is parallel to the PSP, the vector $\vec{M}$ points toward the center of an arc that is traced out by $\hat{s}(\omega)$ when $\omega$ is varied, as seen in FIG. 4(a). Hence, the averaged SOP, $\vec{r}$, aligns toward the PSP direction as the spectral bandwidth increases.

The degree of polarization ("DOP") of the measured SOP as a function of bandwidth, $\Delta\omega_{pulse}^2$, is given by $$DOP^2 = |\vec{r}|^2 1 - {}_{pulse}{}^2 \tau_{DGD}^2 |\vec{s}_\perp(\omega_0)|^2 \quad (16)$$

Accordingly, Eqs. (14) and (16) provide three independent scalar equations to solve for $\vec{\Omega}$. The straight-line plots of the components of $\vec{r}$ and $DoP^2$ are linear in $\Delta\omega_{pulse}^2$, with gradients $$\vec{g}_r = -\frac{1}{2}\tau_{DGD}^2\vec{s}_\perp(\omega_0) \text{ and } g_{DOP} = -\tau_{DGD}^2|\vec{s}_\perp(\omega_0)|^2,$$

respectively. These equations can be rearranged as $$\tau_{DGD} = \frac{2|\vec{g}_r|}{\sqrt{|g_{DOP}|}} \text{ and } \vec{s}_\perp(\omega_0) = \frac{-2\vec{g}_r}{\tau_{DGD}^2}.$$

By extracting these gradients from a series of measurements, $\tau_{DGD}$ and $\vec{s}_\perp(\omega_0)$ can be determined. As a result of knowing $\vec{s}_\perp(\omega_0)$, the PSP direction is known since the unit vector of $\vec{\Omega}$ lies in the same direction of $\hat{s}(\omega_0) - \vec{s}_\perp(\omega_0)$. $\hat{s}(\omega_0)$ is obtained from the y-intercepts of Eq. (14).

The formalism presented above treats the situation where the spectrum is symmetric about $\omega_0$. However, if the spectrum is asymmetric about $\omega_0$, $\vec{M}$ becomes $$\vec{M} = \Delta\omega_{pulse}[\Omega\times s(107_0)] + \frac{1}{2}\Delta\omega_{pulse}^2\Omega\times[\Omega\times s(\omega_0)] \quad (17)$$

An increase of bandwidth still moves the measured SOP inward as shown in FIG. 4(b). While the trajectory of the averaged SOP no longer moves toward the PSP axis, it still lies in the plane whose normal vector is in the PSP direction. Thus, $\vec{M}$ still lies in this plane.

Second order PMD can also be present. In such systems, $\vec{M}$ no longer lies in the plane normal to the PSP due to an additional vector component, $\frac{1}{2}\Delta\omega_{pulse}^2[\vec{\Omega}_0\hat{s}(\omega_0)]$, in Eq. (12).

For the case of a symmetric spectrum (i.e. $\Delta\omega_{pulse}=0$), $$\vec{r} = \hat{s}(\omega_0) + \frac{1}{2}\Delta\omega_{pulse}^2[\Omega\times[\Omega\times s(\omega_0)] + \Omega_0\times s(\Omega_0)] \quad (18)$$

$$\vec{M} = \frac{1}{2}\Delta\omega_{pulse}^2[\Omega\times[\Omega\times s(\omega_0)] + \Omega_\omega\times s(\omega_0)] \quad (19)$$

From Eqs. (18) and (19), it is apparent that taking the averaged SOP over a symmetrical spectrum, the $2^{nd}$ order PMD contributes to the same order of magnitude as $1^{st}$ order PMD in $\vec{r}$ and $\vec{M}$. An estimate of the $2^{nd}$ order PMD parameters can be obtained using the following methodology: (i) isolate the $1^{st}$ order PMD effect, determine $\vec{\Omega}$, and (ii) determine the $2^{nd}$ order PMD, $\vec{\Omega}_\omega$, using Eq. (19).

To isolate $1^{st}$ order PMD effects, two different signal spectra, $|f_1|^2$ and $|f_2|^2$ can be used, which give different bandwidths $\{\Delta\omega_1, \Delta\omega_1^2\}$ and $\{\Delta\omega_2, \Delta\omega_2^2\}$ respectively. The corresponding $\vec{M}$ vectors, from Eq. (12), are:

$$\vec{M}_1 = \Delta\omega_1[\Omega\times(\omega_0)] + \frac{1}{2}\Delta\omega_1^2[\Omega\times[\Omega\times s(\omega_0)] + \Omega_\omega\times s(\omega_0)] \quad (20)$$

$$\vec{M}_2 = \Delta\omega_2[\Omega\times s(\omega_0)] + \frac{1}{2}\Delta\omega_2^2[\Omega\times[\Omega\times s(\omega_0)] + \Omega_\omega\times s(\omega_0)] \quad (21)$$

By multiplying Eq. (20) by $\Delta\omega_2^2$, Eq. (21) by $\Delta\omega_1^2$, and subtracting one from the other, one removes the second order PMD dependence. Defining, $$\vec{T}(\omega_0) = \frac{\Delta\omega_2^2}{\Delta\omega_1^2}\vec{M}_1 - \vec{M}_2,$$

a vector is obtained that depends only on $1^{st}$ order PMD:

$$\vec{T}(\omega_0) = [\vec{\Omega}\times\hat{s}(\omega_0)]\left(\Delta\omega_1\frac{\Delta\omega_2^2}{\Delta\omega_1^2} - \Delta\omega_2\right) \quad (22)$$

Using different sets of spectra $\{[f_1]^2, |f_2|^2\}$, one deduces $\vec{\Omega}\times\hat{s}(\omega_0)$ from the gradients of Eq. (22) when various components of vector $\vec{T}(\omega_0)$ are plotted with various sets of $$\left(\Delta\omega_1\frac{\Delta\omega_2^2}{\Delta\omega_1^2} - \Delta\omega_2\right).$$

It is worthwhile to note that $\vec{T}(\omega_0)$ is parallel $\vec{\Omega}\times\hat{s}(\omega_0)$, which is the tangential vector to the are on the Poincaré sphere traced out by $\hat{s}(\omega)$ when $\omega$ is varied. Recalling that $$\frac{d}{d\omega}\hat{s}(\omega) = \vec{\Omega}\times\hat{s}(\omega),$$

alternatively $\vec{\Omega}\times\hat{s}(\omega_0)$ can be approximated from the differential change of the Stokes vector, $\hat{s}(\omega)$, when $\omega$ is changed by an infinitesimal amount. However, the aforementioned method is more accurate since one estimates $\vec{\Omega}\times\hat{s}(\omega_0)$ from the gradients of straight-line plots of Eq. (22) with various bandwidths of finite-bandwidth spectra, and, by virtue that averaged SOP is measured.

Figure 5:
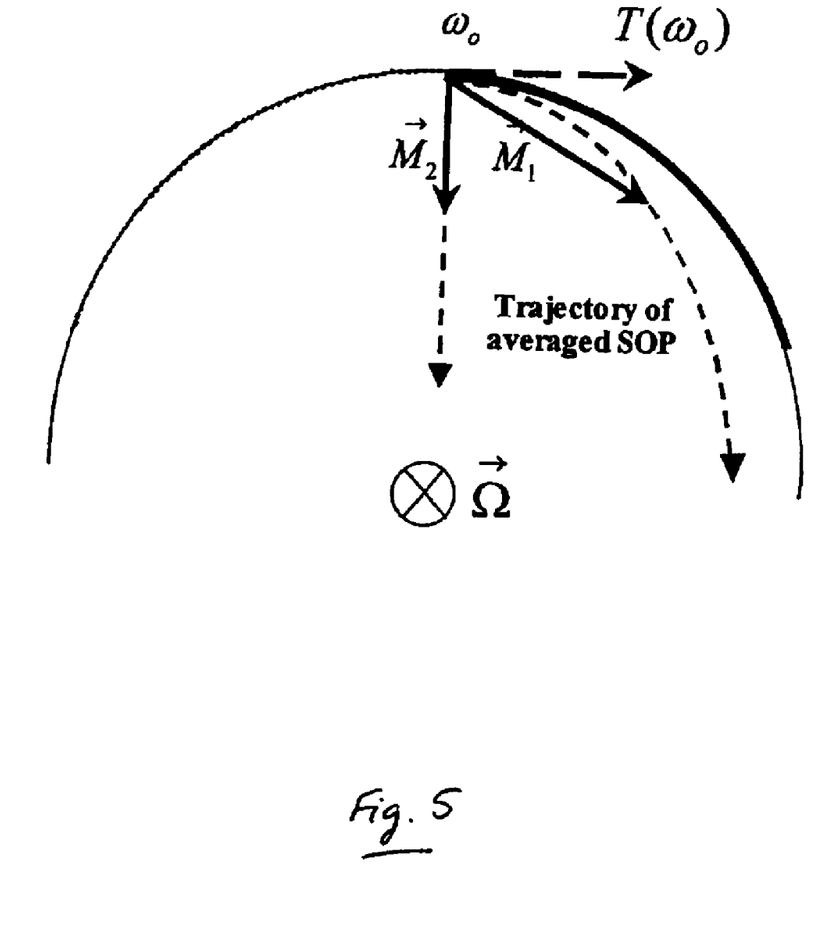
FIG. 5 is a schematic representation of a section of the Poincaré sphere perpendicular to the PSP showing a vector $\vec{T}(\omega_0) = \vec{M}_1 - \vec{M}_2$.

Referring to FIG. 5, to help visualize $\vec{T}(\omega_0)$ and its relationship with $\vec{M}_1$ and $\vec{M}_2$, a special case in which a combination of asymmetrical $|f_1|^2$ and symmetrical $|f_2|^2$, where $\Delta\omega_2^2 = \Delta\omega_1^2$ are used. Because $|f_2|^2$ is symmetrical, $\Delta\omega_2 = 0$. Thus, $\vec{T}(\omega_0)$ reduces to $$\vec{T}(\omega_0) = \vec{M}_1 - M_2 = \Delta\omega_1[\Omega\times s(\omega_0)] \quad (23)$$

To get $\vec{\Omega}$ from $\vec{\Omega}\times\hat{s}(\omega_0)$, knowledge of another vector, for example, $\vec{\Omega}\times\hat{s}$, can be needed. By taking the cross-product of $\vec{\Omega}\times\hat{s}(\omega_0)$ and $\vec{\Omega}\times\hat{s}$, and using the vector identity $a\times(b\times c)=(a.c)b-(a.b)c$, the first order PMD is obtained from the relationship $$\vec{\Omega} = \frac{(\vec{\Omega}\times\hat{s}(\omega_o))\times(\vec{\Omega}\times\hat{s}')}{(\vec{\Omega}\times\hat{s}(\omega_o))\cdot\hat{s}'} \quad (24)$$

There are at least two different ways to experimentally obtain $\vec{\Omega}\times\hat{s}$.

The first method makes use of the bandwidth of the PSP. For an optical frequency $\omega_1$ lying within this PSP bandwidth around $\omega_0$, one can approximate $\vec{\Omega}(\omega_1)\approx\vec{\Omega}(\omega_1)=\vec{\Omega}$. So, by repeating the above measurement and analysis and using Eq. (22), about $\omega_1$, $\vec{\Omega}\times\hat{s}(\omega_1)$ is obtained for the calculation of $\vec{\Omega}$. It is worthwhile to note if $\omega_0$ and $\omega_1$ are separated but stay within this PSP bandwidth, the angle subtended by $\vec{\Omega}\times\hat{s}(\omega_0)$ and $\vec{\Omega}\times\hat{s}(\omega_1)$ is quoted as 0.7 radian by C. D. Poole et al., in "Polarization Dispersion and Principle States in a 147 km Undersea Lightwave Cable," J Lightwave Tech., Vol. 6, No. 7, pp 1185–1190 (July, 1988), and as 0.8±0.4 radian by S. Betti et al., in "Evolution of the bandwidth of the principle states of polarization in single mode fibers," Opt. Lett., Vol. 16, No. 7, pp 467–469 (April, 1991), respectively. Both these references are hereby incorporated by reference in their entirety.

The second method uses another set of measurements made using a second input SOP.

By repeating the measurement and analysis for the second input SOP, $\vec{\Omega}\times\hat{s}$ is obtained. This scheme can be feasible in optical communication systems where a low speed polarization scrambler (e.g., ~kHz) is implemented, e.g., to overcome polarization hole burning in an erbium-doped fiber amplifier (EDFA). Polarization scrambling provides multiple different input SOPs for PMD characterization every millisecond interval, which can improve characterization accuracy. By using a least square fit algorithm to find the unit vector that is perpendicular to all these $\vec{\Omega}\times\hat{s}$ vectors, one can determine the orientation of the PSP.

Second order PMD, $\vec{\Omega}_{1\omega}$, is determined according to Eq. (119). The information listed in Eq. (119) can be determined from a plot of components of $\vec{M}$ vs. $\Delta\omega_{pulse}^2$, which is substantially linear for data acquired using the symmetrical spectrum, $|f_2|^2$. The empirically determined gradients, $\vec{g}$, of these plots correspond to the components of $\vec{\Omega}\times[\vec{\Omega}\times\hat{s}(\omega_0)] + \vec{\Omega}_\omega\times\hat{s}(\omega_0)$ Hence, the components of $\vec{\Omega}_{1\omega}\times\hat{s}(\omega_0)$ are determined by substituting the known components of $\vec{\Omega}$ and $\hat{s}(\omega_0)$ into the right hand side of $$\vec{\omega}_\omega\times s(\omega_0) = g - \Omega\times[\times s(\omega_0)] \quad (25)$$

Using a method similar to the aforementioned methods for obtaining $\vec{\Omega}\times\hat{s}$, the vector $\vec{\Omega}_\omega\times\vec{s}$. By takng the cross-product of $\vec{\Omega}_{\omega\times\hat{s}(\omega0)}$ and $\vec{\Omega}_\omega\times\hat{s}$, *applying the vector identity $a\times(b\times c)=(a.c)b-(a.b)c$, the second order PMD can be determined from the equation:*

$$\vec{\Omega}_\omega = \frac{(\vec{\Omega}_\omega\times\hat{s}(\vec{\omega}_o))\times(\vec{\Omega}_\omega\times\hat{s}')}{(\vec{\Omega}_\omega\times\hat{s}(\omega_o))\cdot\hat{s}'} \quad (26)$$

Figure 6:
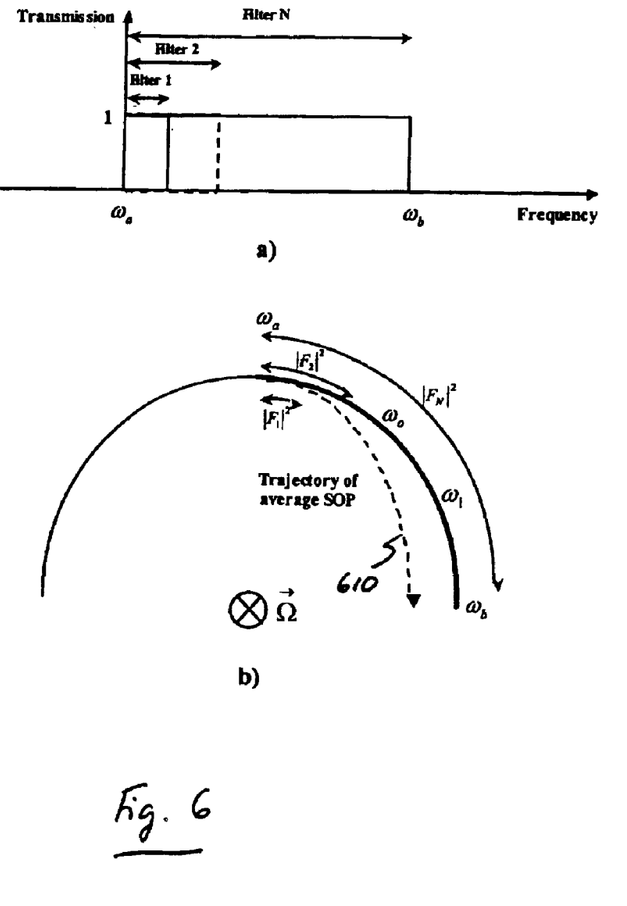
FIG. 6(a) is a plot showing the normalized transmission as a function of frequency for a series of optical filters used for measuring average SOPs between frequencies $\omega_\alpha$ and $\omega_0$.
FIG. 6(b) is a schematic representation of a section of the Poincaré sphere perpendicular to the PSP showing the trajectory of the averaged SOP for SOPs acquired using the optical filters of FIG. 6(a).

There are a number of ways to measure the SOP of a signal for symmetric and asymmetric bandwidth broadening and to implement the aforementioned methods. Referring to FIGS. 6(a) and 6(b), one scheme can include measuring averaged SOPs using several different optical filters that have transmission curves as shown in FIG. 6(a). The unnormalized transmitted spectra ($|F_1|^2$....$|F_N|^2$) are the products of the on-line signal spectra and these transmission curves. Optical frequencies, $\omega_a$ and $\omega_b$, in FIG. 6(a) can be separated by as much as about twice the PSP bandwidth. FIG. 6(b) shows the corresponding trajectory 610 of the averaged SOP when the transmission bandwidth of the filters is increased.

From these measured averaged SOPs, the averaged SOP for the difference of two overlapping spectra can be computed. For example, if the average SOP $\vec{r}_1$ for spectrum $|F_1 2$ and $\vec{r}_2$ for spectrum $|F_2 1$ are known, the averaged SOP for the difference between these spectra, $(|F_2|^2-|F_1|^2)$ can be computed using the equation $$\vec{r}_{diff} = \frac{\vec{r}_2\left(\int |F_2|^2 d\omega\right) - \vec{r}_1\left(\int |F_1|^2 d\omega\right)}{\int |F_2|^2 d\omega - \int |F_1|^2 d\omega} \quad (27)$$

Similarly, the averaged SOP of the sum of two non-overlapping spectra can be computed. For example, if one knows $\vec{r}_{doff}$ for $(|F_2|^2-|F_1|^2)$ and $\vec{r}_{diff}$ for $(|F_3|^2-|F_2-|F_2|_2)$, one can obtain the averaged SOP for the combined spectra of $(|F_2|^2-|F_1|^2)$ and $(|F_3|^2-|F_2|^2)$ spectra by $$\vec{r}_{sum} = \frac{\vec{r}_{diff}\left(\int (|F_2|^2 - |F_1|^2)d\omega\right) + \vec{r}'_{diff}\left(\int (|F_3|^2 - |F_2|^2)d\omega\right)}{\left(\int (|F_2|^2 - |F_1|^2)d\omega\right) + \left(\int (|F_3|^2 - |F_2|^2)d\omega\right)} \quad (28)$$

Using Eqs. (27) and (28) it is possible to determine SOPs corresponding to the sum or difference of any combination of measured spectra.

To characterize the first and second order PMD of a fiber using the methodology outlined above, four sets of averaged SOP data can be determined: one for symmetrical bandwidth broadening and one for asymmetrical bandwidth broadening of bandwidths about two different frequencies, $\omega_0$, and $\omega_1$, where $\omega_a<\omega_0<\omega_1<\omega_b$. These four data sets are constructed by subtracting and combining spectra of $(|F_1|^2 \ldots |F_N|^2)$ using Eqs. (27) and (28). Once constructed, the processor initially determines the first order PMD using Eq. (24), and then determines the second order PMD using Eq. (26).

It will be understood that various modifications may be made to the present embodiment without departing from the spirit and scope of the method and system. For example, although the described system is used to characterize PMD in an optical fiber, the techniques disclosed herein can be used to characterize other optical media. For example, these techniques can be used to determine retardation (i.e., first order PMD) and/or birefringence of a birefringent crystal, polymer, or liquid crystal. Another example includes characterizing the DGD of an optical delay line. Accordingly, other embodiments are within the scope of the following claims.

What is claimed is:

1. A method for characterizing polarization mode dispersion in an optical medium, the method comprising:
   measuring an averaged state of polarization vector of an optical signal in the optical medium for each of a plurality of spectra, each spectrum having a frequency bandwidth different from the other spectra of the plurality of spectra; and
   determining a characteristic of the polarization mode dispersion from an averaged state of polarization vectors and the frequency bandwidths,
   wherein measuring the averaged state of polarization vector of the optical signal comprises deriving a test optical signal from the optical signal, optically filtering the test signal, and measuring averaged state of polarization vectors of the filtered test signal, and optically filtering the test signal comprises sequentially directing the test signal through each of a plurality of bandpass filters, and measuring an averaged state of polarization vector for each of the bandpass filters.

2. The method of claim 1, wherein at least a portion of the plurality of spectra have a symmetric bandwidth about a predefined frequency.

3. The method of claim 1, wherein at least a portion of the plurality of spectra have an asymmetric bandwidth about a predefined frequency.

4. The method of claim 1, further comprising determining a second state of polarization vector from the measured averaged state of polarization vectors for each of a plurality of spectra, each of the second state of polarization vectors having a symmetric bandwidth about a predefined frequency.

5. The method of claim 1, further comprising determining a second state of polarization vector from the measured averaged state of polarization vectors for each of a plurality of spectra, each of the second state of polarization vectors having an asymmetric bandwidth about a predefined frequency.

6. The method of claim 1, wherein determining the characteristic of the polarization mode dispersion includes measuring a perturbation of the averaged state of polarization vectors from a polarization state at a predefined frequency and a parameter related to the bandwidths of the different spectra.

7. The method of claim 1, wherein the characteristic of polarization mode dispersion comprises a measure of first order polarization mode dispersion.

8. The method of claim 1, wherein the characteristic of polarization mode dispersion comprises a measure of second order polarization mode dispersion.

9. The method of claim 1, wherein the characteristic of polarization mode dispersion is determined in real-time.

10. The method of claim 1, wherein the optical medium is an optical fiber.

11. The method of claim 1, wherein determining the characteristic of polarization mode dispersion comprises determining a trajectory of the averaged state of polarization in the Poincaré sphere as a function of frequency bandwidth.

12. An optical system comprising:
    a variable optical filter positioned to variably filter the transmission bandwidth of an optical test signal to a polarimeter; and
    a polarimeter configured to receive the filtered optical test signal and to measure the average state of polarization of the optical test signal for each transmission bandwidth;
    a controller configured to determine first and second order polarization mode dispersion parameters of the optical input signal based on the average state of polarization and the transmission bandwidth of the filtered optical test signal; and
    a transmitter configured to launch the optical signal into the optical fiber at the first location, wherein the transmitter comprises a polarization scrambler.

13. The optical system of claim 12, further comprising an optical fiber configured to transmit an optical signal from a first location to a second location, wherein the optical test signal is derived from the optical signal.

14. The optical system of claim 12, further comprising a compensator configured to compensate the optical signal based on the first and second order polarization mode dispersion parameters to produce a compensated output optical signal.

15. The optical signal of claim 14, wherein the optical signal is compensated in a feed-forward mode.

16. The optical system of claim 14, further comprising a receiver configured to detect the compensated output optical signal at the second location.

17. The optical system of claim 12, further comprising a tap configured to derive the optical test signal from the optical signal.

18. The optical system of claim 17, wherein the tap is coupled to the optical fiber near the second location.

19. The optical system of claim 12, wherein first and second order polarization mode dispersion parameters of the optical test signal are related to first and second order polarization mode dispersion parameters of the optical signal.

* * * * *